United States Patent
Cavalcanti et al.

(10) Patent No.: US 10,534,370 B2
(45) Date of Patent: Jan. 14, 2020

(54) SYSTEM AND METHODS TO SUPPORT AUTONOMOUS VEHICLES VIA ENVIRONMENTAL PERCEPTION AND SENSOR CALIBRATION AND VERIFICATION

(71) Applicant: SIGNIFY HOLDING B.V., Eindhoven (NL)

(72) Inventors: Dave Alberto Tavares Cavalcanti, Mahopac, NY (US); Marcin Krzysztof Szczodrak, New York, NY (US); Talmai BrandÃo De Oliveira, North Andover, MA (US); Yong Yang, Ossining, NY (US)

(73) Assignee: SIGNIFY HOLDING B.V., Eindhoven (NL)

( * ) Notice: Subject to any disclaimer, the term of this patent is extended or adjusted under 35 U.S.C. 154(b) by 84 days.

(21) Appl. No.: 15/301,600

(22) PCT Filed: Apr. 2, 2015

(86) PCT No.: PCT/IB2015/052421
§ 371 (c)(1),
(2) Date: Oct. 3, 2016

(87) PCT Pub. No.: WO2015/151055
PCT Pub. Date: Oct. 8, 2015

(65) Prior Publication Data
US 2017/0023945 A1    Jan. 26, 2017

Related U.S. Application Data

(60) Provisional application No. 61/975,244, filed on Apr. 4, 2014.

(51) Int. Cl.
*G05D 1/02* (2006.01)
*H05B 37/02* (2006.01)
(Continued)

(52) U.S. Cl.
CPC ......... *G05D 1/0285* (2013.01); *G08G 1/0116* (2013.01); *G08G 1/0141* (2013.01);
(Continued)

(58) Field of Classification Search
CPC ............ G05D 1/0285; G06K 9/00805; G08G 1/0116; G08G 1/0141; G08G 1/04;
(Continued)

(56) References Cited

U.S. PATENT DOCUMENTS

| | | | |
|---|---|---|---|
| 5,155,684 A | 10/1992 | Burke et al. | |
| 7,663,505 B2 * | 2/2010 | Publicover | G08G 1/095 340/932 |

(Continued)

FOREIGN PATENT DOCUMENTS

| | | |
|---|---|---|
| CN | 102665348 A | 9/2012 |
| DE | 102012016867 A1 | 9/2013 |
| WO | 2011160006 A1 | 12/2011 |

OTHER PUBLICATIONS

U.S. Appl. No. 61/839,472, filed Jun. 2013, De Oliveiera, Talmai Brandao.*

*Primary Examiner* — Richard A Goldman
(74) *Attorney, Agent, or Firm* — Daniel J. Piotrowski

(57) ABSTRACT

An autonomous vehicle support system, including a lighting network (100) having, a plurality of light units (106-1, . . . , 106-N) wherein at least one light unit includes at least one sensor type (110-1, . . . , 110-N), and a centralized or distributed controller (102, 105-1, . . . , 105-N), wherein a first light unit (106-1, . . . , 106-N) receives sensor data from its sensor type (110-1, . . . , 110-N), wherein the controller (105-1, . . . , 105-1) forms a local environmental perception of an area local to the first light unit (106-1, . . . , 106-N), using the received sensor data from light unit, and receives sensor measurement data from an autonomous vehicle relating to at least a portion of the area, and cross-validates the local environmental perception of the area and the sensor measurement data from the autonomous vehicle.

14 Claims, 3 Drawing Sheets

(51) Int. Cl.
*G08G 1/01* (2006.01)
*G08G 1/04* (2006.01)
*G08G 1/09* (2006.01)

(52) U.S. Cl.
CPC ............... *G08G 1/04* (2013.01); *G08G 1/091* (2013.01); *H05B 37/0272* (2013.01); *B60W 2550/00* (2013.01)

(58) Field of Classification Search
CPC ........ G08G 1/091; G08G 1/162; G08G 1/163; G08G 1/161; G08G 1/165; G08G 1/166; G08G 1/0104; H05B 37/0272; B60W 2550/00; B60W 2550/10
USPC .......... 701/23, 117, 300, 301, 36, 2; 315/76, 315/77; 340/435, 436, 901, 902
See application file for complete search history.

(56) References Cited

U.S. PATENT DOCUMENTS

| | | | | |
|---|---|---|---|---|
| 8,618,952 | B2* | 12/2013 | Mochizuki | G08G 1/161 340/435 |
| 8,855,849 | B1* | 10/2014 | Ferguson | G05D 1/00 701/28 |
| 8,965,691 | B1* | 2/2015 | Lombrozo | G01P 3/481 701/26 |
| 9,224,053 | B1* | 12/2015 | Ferguson | G06K 9/00798 |
| 9,706,624 | B2* | 7/2017 | Zou | F21S 8/086 |
| 9,719,801 | B1* | 8/2017 | Ferguson | G01C 25/00 |
| 9,824,583 | B2* | 11/2017 | Popple | G08G 1/096725 |
| 2003/0114980 | A1 | 6/2003 | Klausner et al. | |
| 2005/0228578 | A1* | 10/2005 | Burzio | G08G 1/0104 701/117 |
| 2007/0043491 | A1* | 2/2007 | Goerick | B60K 28/165 701/41 |
| 2008/0208462 | A1* | 8/2008 | Tanaka | G01C 21/3453 701/414 |
| 2008/0275618 | A1* | 11/2008 | Grimm | G08G 1/162 701/96 |
| 2009/0030601 | A1* | 1/2009 | Sawaki | G01C 21/3632 701/457 |
| 2010/0198513 | A1* | 8/2010 | Zeng | B60W 40/02 701/300 |
| 2010/0235129 | A1 | 9/2010 | Sharma et al. | |
| 2011/0153166 | A1* | 6/2011 | Yester | B60K 35/00 701/45 |
| 2012/0038490 | A1* | 2/2012 | Verfuerth | H05B 37/0272 340/910 |
| 2012/0074842 | A1* | 3/2012 | Hattori | B60Q 1/1423 315/77 |
| 2012/0232781 | A1* | 9/2012 | Sugawara | G01C 21/3655 701/400 |
| 2013/0054089 | A1* | 2/2013 | Nordbruch | B60Q 1/085 701/36 |
| 2013/0268152 | A1* | 10/2013 | Koshizen | B60L 15/2045 701/22 |
| 2014/0266799 | A1* | 9/2014 | Liu | G06Q 30/0259 340/928 |
| 2014/0379247 | A1* | 12/2014 | Ferguson | B60W 30/09 701/301 |
| 2015/0023668 | A1* | 1/2015 | Spaulding | H04B 10/1129 398/106 |
| 2015/0025709 | A1* | 1/2015 | Spaulding | G08G 1/163 701/2 |
| 2015/0088373 | A1* | 3/2015 | Wilkins | G05D 1/0234 701/36 |
| 2015/0241880 | A1* | 8/2015 | Kim | G05D 1/0287 701/25 |
| 2016/0012722 | A1* | 1/2016 | Filali | G08G 1/0125 701/118 |
| 2016/0167580 | A1* | 6/2016 | Hanita | B60Q 9/008 701/301 |
| 2017/0118821 | A1* | 4/2017 | Zou | F21S 8/086 |
| 2017/0124864 | A1* | 5/2017 | Popple | H04W 76/10 |
| 2017/0124869 | A1* | 5/2017 | Popple | G08G 1/096725 |
| 2017/0270798 | A1* | 9/2017 | Ushiba | B60W 30/16 |
| 2017/0301220 | A1* | 10/2017 | Jarrell | H04W 4/70 |
| 2017/0320433 | A1* | 11/2017 | Zhang | B62D 15/023 |

\* cited by examiner

SYSTEM AND METHODS TO SUPPORT AUTONOMOUS VEHICLES VIA ENVIRONMENTAL PERCEPTION AND SENSOR CALIBRATION AND VERIFICATION

CROSS-REFERENCE TO PRIOR APPLICATIONS

This application is the U.S. National Phase application under 35 U.S.C. § 371 of International Application No. PCT/IB2015/052421, filed on Apr. 2, 2015, which claims the benefit of U.S. Provisional Application No. 61/975,244, filed on Apr. 4, 2014. These applications are hereby incorporated by reference herein.

The present invention is directed generally supporting autonomous vehicles by utilization of lighting networks with sensing and communication capabilities to (1) enhance environmental perception of the road by receiving support information from surrounding lighting network infrastructure and (2) quantify and calibrate the vehicle's quality of perception of the surrounding environment, for example, the local area of near a light pole/unit. More particularly, various inventive methods and apparatus disclosed herein relate to improving autonomous vehicles performance by using information collected from the surrounding Outdoor Lighting Network (OLN), as well as the vehicle's sensor measurement data and calibration thereof. Thereby enabling detection of inconsistency and failure of environment perception through comparison of vehicle's sensor measurement data with the surrounding Outdoor Lighting Network (OLN) local area sensor data to provide an enhanced understanding of road conditions. The OLN includes an array of light units, and a network apparatus, hardware, and software for monitoring and managing the array, and analyzing sensor information gathered from the array for targeted information communication.

One of the main services of the outdoor lighting is the improvement of drivers' perception of the road conditions and the surrounding area. Light serves as medium delivering signals from environment. These signals are captured by eyes and further processed by human brain to create visualization of the surrounding world. However, in situations where cars can drive autonomously, people will not be continuously in the control of the vehicles and they will not be required to observe the road; instead they will spend the commuting time on various other activities.

The traditional scenario of people driving on a road will no longer be valid. The fundamental goal of such outdoor lighting systems installed on roads and highways is to provide sufficient amount of light that after reflecting from a road delivers information captured by human eyes and once processed helps to understand the road conditions.

In a long-term scenario when people do not need to observe the road during commuting, the main use of the outdoor lighting will change from humans to systems in the car. So, there is a new role for lighting, which is not necessarily only to guide human vision, but also sensing systems, and only dynamically adjusting lighting is needed in areas with pedestrian traffic—such as local roads and parking lots.

In the short to mid-term, the roadway scenarios will likely include both autonomous cars and drivers, so during this transition period, there is an opportunity for the lighting system to provide new services to support the autonomous vehicles in addition to the traditional illumination.

The technology of Self-driving, autonomous cars has been proven to work. Recent laws have been passed allowing cars to control themselves: in 2012 self-driving cars were allowed in Nevada, California and Florida. Soon people will not be required to drive cars, but cars will drive by themselves. This business paradigm shift in the demand of the type of road infrastructure support does not necessarily mean that outdoor lighting infrastructure will not be installed on the roads of the future. Instead, as vehicles continue to advance technologically, outdoor lighting will continue to evolve and have the opportunity to provide enhanced services. Many of the current inventions that aim on improving driving conditions for people will be shifted toward assisting autonomous vehicles control and maneuvering. Thus, the outdoor lighting network (OLN) will serve a dual purpose: (1) it will support driving and safety by communicating with vehicles, and (2), it will provide communication and entertainment services to people who no longer are occupied with steering vehicles.

Wireless sensing and actuating will still play critical role in OLNs; however, this time through interaction with the vehicles' control system, thus closing the control loop, while minimizing the interaction with people only to the entertainment content. Platforms for collecting information about road conditions through various sensors and cameras will enhance the vehicles' perception of the road conditions. Further data collected from connected devices, such as mobile devices, e.g. smart phones, smart watches, etc., will be used to enhance vehicles' far-distance understanding of the road conditions. While vehicles will be instrumented with the minimum of technological equipment allowing a car to drive in most of conditions—the limit that comes from vehicles space size and payload weight constraints—OLN heterogeneous infrastructure will provide sensing equipment that will not physically fit in a car. And then, as cars drive by themselves, OLN will take care of passengers by sending entertaining content directly to their phones, tablets and other mobile devices connected directly to cellular networks, for example.

With prior art of the autonomous vehicles, the technology requires collection of a priori information about a road and surrounding environment, before a self-driving car can safely navigate on a road. For example, Google car is an example of autonomous vehicle which real-time sensory perception is further enhanced by additional information about the road environment, i.e. before Google lets its cars to drive on a road, it sends conventionally driven car to map the road and the surrounding area. Once this data is collected, at-runtime the self-driving car uses a beam laser that generates 3D map of the surrounding environment. The laser observations are compared with the static information about the environment, and synthesized together to provide high fidelity information used by the vehicle's control system.

This navigation approach assumes that the road environment is static. For example, the system assumes that sidewalks are always in the same place and that the road has fixed width and known distance to the surrounding building infrastructure. However, road conditions are often dynamic, and obstacles may appear. Furthermore, environmental changes take long period of time to be detected, and therefore cannot be observed at run-time by a vehicle. These slow changes require periodic re-scanning of the surrounding environment and bringing the 3D maps up to date.

Consequently, autonomous vehicles struggle with understanding the environment under such scenarios. While advancement in the vehicle's sensor technology continues, it is unlikely that at any time a car by itself will have ability to fully observe and understand the dynamics of the road environment, i.e. a single car by itself will not be able to "see" behind physical objects nor predict actions from other drivers. So, for example, a person getting out of a bus and attempting to enter the road to cross on the other side will still continue to be undetectable by the autonomous vehicles. Furthermore, an arriving car or a motor bike that enters a crossroad on a red light from another street located behind a building will not be detectable by the autonomous vehicle itself, and thus the vehicle will not know that it needs to stop to prevent collision.

Moreover, autonomous vehicles make control decisions based on the readings from the vehicle's sensory system. The challenge in the self-driving vehicles is in discovery of faults in the measurements of the sensor system and establishing how reliable the sensor measurements are. This is a critical aspect of building a close-loop system, such as autonomous vehicle, because the actuation signals come from a control system that computes decisions based on its perception of the environment. Thus, a car fails to navigate correctly when the sensor measurements are incorrect.

The sensor system may fail due to multiple factors, such as long time use or car accidents. The first one can be solved by periodic car inspection and sensor replacement. Although period inspections help keep the system running, inspections will only be done sporadically, and cannot detect malfunctions while the vehicle is being used, this is a serious problem. Malfunctions could include: problems with sensors, problem with vehicle lighting system (e.g. headlights alignment, missing lights, . . . ). Given the safety risks involved, there is a need for a system to continuously monitor the accuracy and operation of the sensor system. The second type is an obvious accident that impairs car from continuing driving.

The challenging sensor faults are the ones that occur when cars are in motion and they cannot detect the faults, thus increasing the risk of an accident. Such measurement errors can accumulate over time, as in case of dust, or be interpreted by a car as an acceptable change to the road conditions, e.g. in case of a bug hitting a sensor a vehicle may mistakenly detects a presence of a car that is not there or dust/snow/ice blocking the view of a sensor preventing it from detecting a car or obstacle nearby, which is also a serious issue.

Autonomous vehicles are also vulnerable to malicious tempering of their sensors. Although, a vehicle can be instrumented with multiple sensors to cross validate each other, it is still possible that multiple or all sensors fail due to malicious tempering. Thus a road-side infrastructure verifying the vehicle's perception is helpful to increase the driving security of the autonomous vehicles.

According to the principles of the present invention and to overcome or improve the above limitations, we provide a system to detect ground truth of road conditions and continuously monitor the [road] environment and store the measurement data. The system includes light units instrumented with sensors, a communication interface, a local database for storing measurement data, and a remote centralized database for collecting road information for clusters of light units. The communication interface allows transfer of messages to and from [autonomous] vehicles. The messages provide information about unique changes of the road environment, as well as to enable exchange of measurements with [autonomous] vehicles and among each other to cross-validate their respective understanding of the road conditions.

In one embodiment, the present invention is a system comprising a lighting network (LN) including an array of light units or luminaries, sensors and/or other integrated or connected devices (hereinafter referred to as "light units"), a central management system (CMS), cloud server or controller, a wired/wireless network, including software, firmware, for monitoring and managing the LN, as well as information management via the LN. The LN comprises multiple light units that may operate mainly in an independent mode where sensing, communication, and control processes take place between the various light units. Further communication and control may be provided between the light units and a CMS.

The controller, which may be a local control in a light unit or a central management system (CMS) or a cloud server is operable to: receive and process light unit information, in particular, sensor unit data or connected device information, collect and process sensor data, sensor measurement data from vehicles and connected device information and detect events that are outside the perception range/view of the vehicles (events could also include combinations of several conditions (e.g. hazardous weather and poor visibility), for example, an event may include: obstruction of vehicle visual perception (e.g. cameras/sensors have impaired vision due to external factor), depending on the amount of the obstruction (e.g. as a percentage of the overall view), the system can set an alert/emergency to the driver, and/or to third party; an outside object is detected (e.g. snow accumulation) over time, and after a certain threshold an event is created to update/calibrate the vehicle measurement system); combine local processing at the light points and at the remote cloud to analyze a time series of multiple sensor measurements and compute trends in the environmental change and by comparing the sensor measurements and the environmental changing trends with the static information that vehicle has, to compute the difference in vehicle's perception; filter events and identifying the high priority events that complement the autonomous vehicles perception, i.e., events that are not detectable or cannot be fully understood by the vehicle itself; receive and respond to vehicle queries; and broadcast alarms about events that reflect emergency conditions on a road that are outside the vehicle's perception range; collect and process sensory data to create a profile containing a set of attributes that characterizes road conditions; compute the difference between sensory ground truth and vehicles' measurements to assess the measurement error; cross-validated and enhance the ground truth with third-party data, e.g. weather forecast and traffic measurements can be used to validate measurements; detect emergency situation and safety issues based on the difference between the road condition's ground truth and the vehicle's perception of the road conditions and communicate an action to a vehicle including a safe pull-over and guide further actions or the roadside infrastructure could disable the autonomous vehicle mode and return the vehicle to manual operation; warn a person present in a vehicle about the vehicle's impaired perception based on the difference between the road condition ground truth and the vehicle's perception of the road conditions; and inform municipalities about malfunctioning vehicle (e.g. a vehicle with impaired visibility of the road conditions) and to warn other vehicles driving within a short distance from a malfunctioning vehicle; coordinate the operation of the identified lighting units as a function of the lighting strategy, and send operation instructions to one more of light units to direct the identified light units to operate in accordance with the operation.

Another aspect of the invention provides a light unit in the LN connected to a CMS, the light unit includes a processor; a memory operably connected to the processor; a sensing unit, and a communication module operably connected to the processor for communication with the CMS and other light units. The sensor can be any sensor for sensing any environmental condition. The processor is operable to: receive sensing data and determine various conditions including lighting conditions, user/vehicle detection status, etc. with or without the CMS; transmit the sensor data through the communication module to the CMS; receive an operation instruction for operation of the light unit through the communication module from the CMS; and direct the light unit to operate in accordance with the operation instruction.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well-known devices, circuits, tools, techniques, and methods are omitted so as not to obscure the description of the present system. It should be expressly understood that the drawings are included for illustrative purposes and do not represent the scope of the present system. In the accompanying drawings, like reference numbers in different drawings may designate similar elements. Also, the drawing figures are not necessarily to scale, emphasis instead generally being placed upon illustrating the principles of the invention.

Embodiments of the present system may interface with conventional lighting infrastructures such as urban walkway, street, and/or highway lighting systems to control one or more portions of conventional lighting systems. It should also be understood that the sensors of the sensing unit can be any sensor for sensing any environmental condition, ranging from any electromagnetic signals to acoustic signals to biological or chemical signals to other signals. Examples include an IR detector, a camera, a motion detector, an ozone detector, a carbon monoxide detector, other chemical detectors, a proximity detector, a photovoltaic sensor, a photoconductive sensor, a photodiode, a phototransistor, a photo emissive sensor, a photo electromagnetic sensor, a microwave receiver, a UV sensor, a magnetic sensor, a magneto resistive sensor, a-Rd a position sensor, and a RF scanners to identify Mobile devices (e.g. Bluetooth, wifi, etc.).

Figure 1:
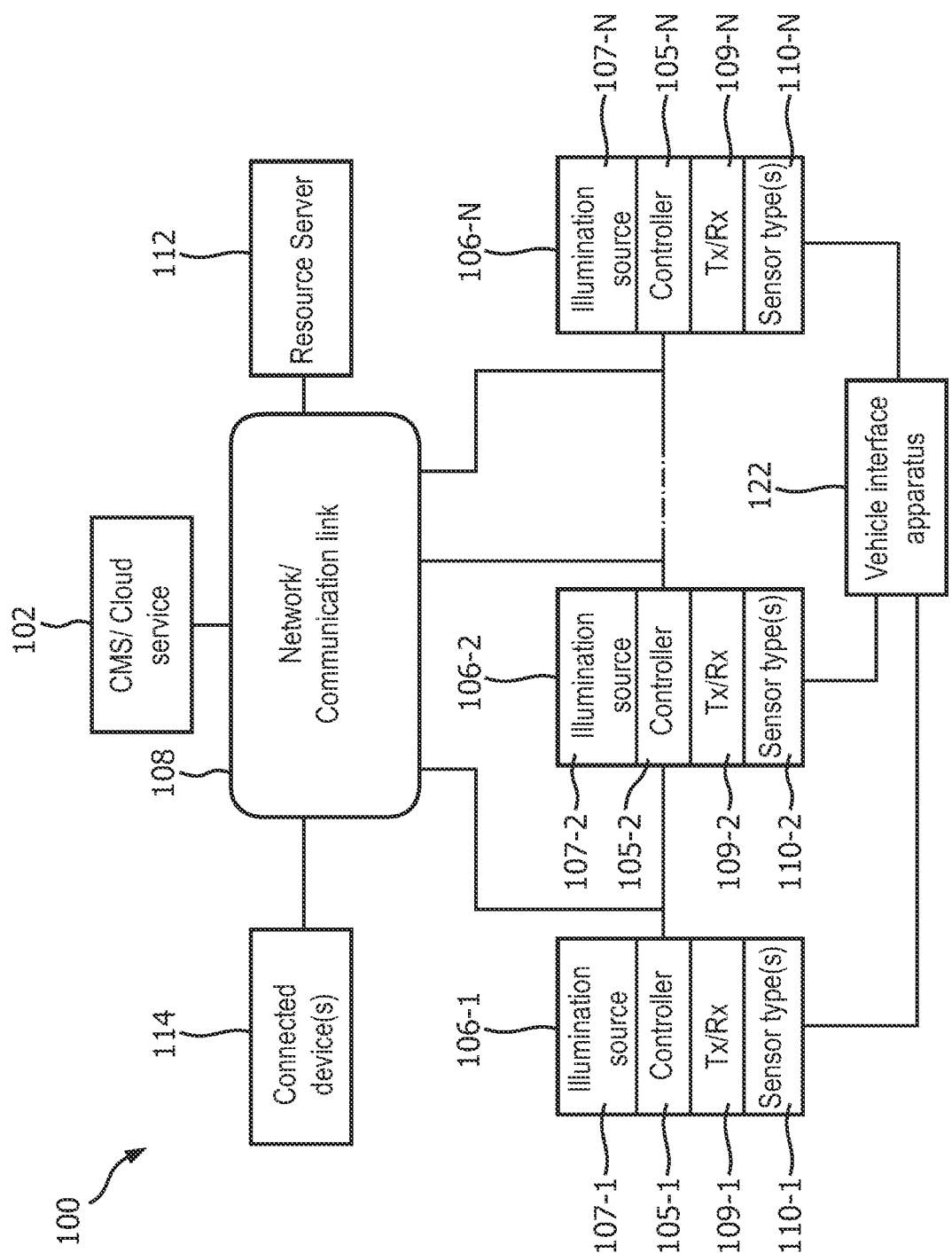
FIG. 1 is a schematic view of an lighting network (LN) in accordance with embodiments of the present system.

FIG. 1 is a schematic view of a lighting network (LN) 100, a controller, central management system (CMS) or a cloud service 102 and an information resources server 112 (e.g. weather, traffic, public safety/security reports or other, for example news media or Internet available information), in accordance with embodiments of the present system. Although FIG. 1 shows the elements of the lighting network (LN) 100 as discrete elements, it is noted that two or more of the elements may be integrated into one or device. The lighting network (LN) 100 includes a plurality of intelligent light units or luminaries (and/or electrical devices) 106-1 through 106-N (generally 106), a plurality of illumination sources 107-1 through 107-N, a plurality of controllers 105-1 through 105-N, a plurality of transmission/receive (TX/Rx) units 109-1 through 109-N, a plurality of sensors 110-1 through 110-N, one or more [autonomous] vehicle interface apparatus 122, connected device(s) 114 and a network/communication link 108 which, in accordance with embodiments of the present system, may operably couple two or more of the elements of the present system.

The vehicle interface apparatus 122 may include any number of security authorizations methods (including conventional security methods and ones described further below). The vehicle interface apparatus 122 can be implemented as a dedicated device or incorporated in another device. The vehicle interface apparatus 122 can be implemented in a mobile phone, PDA, computer (e.g., laptop, tablet such as an iPad), and the vehicle itself, mobile GPS device, any intelligent device/machine, a sensing device or any other device accessible to a user. The vehicle interface apparatus may operate independently as an autonomous device without user interaction. The vehicle interface apparatus 122, in one embodiment, responds to received external stimulus (e.g. sensor data from light unit 106), to initiate an appropriate system responses.

The vehicle interface apparatus 122 communicates with the OLN, using any desired technology, such as a cellular data communication protocol (e.g., GSM, CDMA, GPRS, EDGE, 3G, LTE, WiMAX,), DSRC or WiFi radio, ZigBee protocol operating on top of the IEEE 802.15.4 wireless standard, WiFi protocol under IEEE standard 802.11 (such as 802.11b/g/n), Bluetooth protocol, Bluetooth Low Energy protocol, visual light communication (VLC), or the like.

When LN 100 is installed, the GPS coordinate information of each element (e.g. light units 106, connected devices 114 (light poles, sensors 110, traffic lights, etc.) in the system is generally recorded, and is available to CMS 102. All the elements are typically further placed onto a map, therefore it is known to the CMS 102, for example, which traffic light regulates the traffic leading to certain light units 106. This information can be included manually at commissioning or can be deduced using the relative GPS coordinates and the geographical map with tagged streets and traffic flows, available e.g. on OpenStreetMap. Associations between light units 106 can then be stored in the memory of the CMS 102.

The connected device 114 can be any element in a smart city connected infrastructure that can provide information to help the light units 106 tune its detection behavior to improve robustness. The connected device is any device that includes an interface apparatus to communicate with the LN 100 via network 108. Any desired technology, such as a cellular data communication protocol (e.g., GSM, CDMA, GPRS, EDGE, 3G, LTE, WiMAX,), DSRC or WiFi radio, ZigBee protocol operating on top of the IEEE 802.15.4 wireless standard, WiFi protocol under IEEE standard 802.11 (such as 802.11b/g/n), Bluetooth protocol, Bluetooth Low Energy protocol, or the like, can be used.

The connected devices 114 may include the following: connected pedestrian or bicycle units to distinguish traffic types to enable the system to behave differently depending on the traffic type; variable connected traffic signs to allow dynamically steering traffic flows, open/close lanes as needed, direct drivers in parking areas etc.; connected surveillance cameras; connected traffic management systems; connected (interactive) kiosks and advertising.

The CMS 102 may include one or more processors which may control the overall operation of the lighting network (LN) 100. The CMS 102 may also be "distributed" (e.g. de-centralized in-network processing or hierarchical system, for example, the StarSense system where each segment controller controls a sub-set of light units). Moreover, the processing may be distributed between the CMS 102 and one or more controllers 105, described further below. The CMS 102 may also access to other information about the system and the environment, such as date/time of the day, historic detection data, condition of the infrastructure etc., for example, received via Resource Server 112. Moreover, the CMS 102 may request information from the resources server 112 and may determine when to change system settings based on received information and/or history information (e.g., traffic light status, security data, pedestrian data or other so-called "connected" data means available from the Internet, for example). The system may include statistical and/or heuristic engines to fit data. LN 100 can use a city management dashboard application such as the Philips CityTouch. Accordingly, the CMS 102 may communicate with, the light units 106, the sensors 110, to send and/or receive (via Tx/Rx units 109) various information in accordance with embodiments of the present system.

The memory in the LN and CMS may include any suitable non-transitory memory and is used to store information used by the system such as information related to operating code, applications, settings, history, user information, account information, weather related information, system configuration information, calculations based thereon, etc. The memory may include one or more memories which may be located locally or remote from each other (e.g., a surface area network (SAN).

As noted above, the CMS 102 stores information in the memory (e.g., historical information) which it receives and/or generates for further use such as to determine lighting characteristics and sensor detection thresholds in accordance with embodiments of the present system. As new information is received by the CMS 102, the stored information may then be updated by the CMS 102. The CMS 102 may include a plurality of processors which may be located locally or remotely from each other and may communicate with each other via the network 108.

The network 108 may include one or more networks and may enable communication between one or more of the CMS 102, the light units 106, the sensors 110, using any suitable transmission scheme such as a wired and/or wireless communication schemes. Accordingly, the network 108 may include one or more networks such as a wide area network (WAN), a local area network (LAN), a telephony network, (e.g., 3G, a 4G, etc., code division multiple access (CDMA), global system for mobile (GSM) network, a plain old telephone service (POTs) network), a peer-to-peer (P2P) network, a wireless fidelity (WiFi™) network, a Bluetooth™ network, a proprietary network, the Internet, etc.

The Resource server 112, which may include other related information resources such as proprietary and/or third party news media and Internet related resources which may provide information such as public safety, security, regulatory, traffic, weather, road condition reports and/or forecasts to the CMS 102 and/or the light units 106. This information may be used to further refine a light units 106 local or broad environmental perception of an area.

The sensors 110 may include a plurality of sensors types such as sensors 110 which may generate sensor information based on the particular sensor type such as image information, status information (e.g., light unit operative, non-operative, etc.), radar information (e.g., Doppler information, etc.), geophysical information (e.g., geophysical coordinates obtained from, for example, a global positioning system (GPS)), pressure information, humidity information, etc. The sensors 110 may be located at one or more geophysical locations or integrated into a light unit 106, and may report their location to the CMS 102. Each sensor 110 may include a network address or other address which may be utilized to identify the sensor.

The light units 106 may include one or more illumination sources 107 such as lamps (e.g., a gas lamp, etc.), light emitting diodes (LEDs), incandescent lamps, fluorescent lamps, etc., and may be controlled by the controller 105. The illumination sources may be configured in a matrix (e.g., a 10×10 matrix of illumination sources) in which illumination characteristics such as illumination pattern, intensity, spectrum (e.g., hue, color, etc.), polarization, frequency, etc., from one or more of the plurality of illumination sources and/or light pattern for a plurality of illumination sources, may be actively controlled by the system.

Figure 2A:
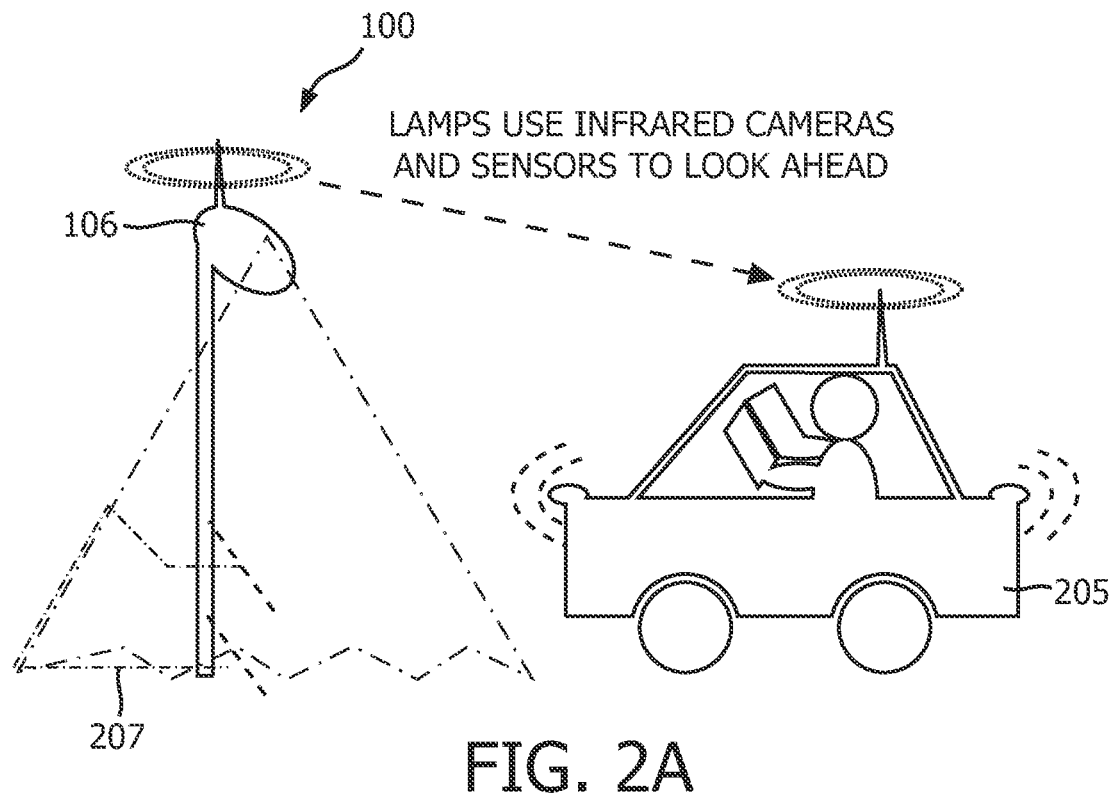
FIG. 2a is perspective view of a lighting system in accordance with embodiments of the present system.

FIG. 2A is perspective view of the lighting system 100 (showing a portion of outdoor lighting network (LN) 100) in accordance with embodiments of the present system). The lighting system 100 may be similar to the lighting network (LN) 100 and may include a plurality of light units 106-1 through 106-N which may both illuminate an area or surface (such as a street) and detect the presence of objects in a detection zone 207. One or more of the light units 106 may include one or more of an illumination source 107, a controller 105, a Tx/Rx unit 109 (not shown) and may also include connected devices 114 (not shown), illustratively a traffic light.

Light units 106 detect the presence of object/pedestrians/ etc. in a local area or detection zone 207. This information can be used for monitoring purposes and stored in the light units 106 memory or CMS 102 memory for evaluation. Each light unit 106 creates a detection signal that combines aspects of the sensor output signals useful to perform detection, and that presence is assessed by comparing such detection signal to a detection threshold. Thus, detection performances depend only to the setting of the detection threshold, in this case: if the detection signal is higher than the detection threshold, presence is detected, otherwise not. It should be noted that this is an oversimplification, since presence detection algorithms are typically sophisticated processing algorithms that use a large number of signal qualities to assess presence.

Light pole 106 instrumented with sensor types 110 (e.g. a laser, camera and various sensors, such as motion and distance, as shown in FIG. 1), which together observe the environment and send this information to autonomous car(s) 205. For example, an infrared camera (not shown) detects motion from a vehicle that passed in front of a sensor. The sensor data is stored in the light unit 106 memory, processed, and broadcasted to nearby vehicles 205.

The lighting system 100 not only monitors the road conditions, but also observes the surrounding environment.

For example, to understand the environment dynamics, sensors monitor surrounding sidewalks, buildings, and nature, to bring awareness on possible adults and children entering the road from a sidewalk or a building, and animals that run out of forest onto the road.

The collected data may be stored in a light unit's 106 local memory. At the light unit 106, the data may be locally processed by controller 105 (however, it is noted the CMS or remote cloud service 102 may also preform this processing) For example, the short-term data processing algorithms detect patterns and suspicious or emergency activity that requires immediate attention. These emergency activities put real-time constrains on the vehicles, which must quickly react and adapt their driving to prevent collisions or accidents.

Illustratively, the controller 105, CMS or remote cloud service 102 processes the sensor data to observe the (short and) long term changes in the road environment. For example, using measurements from multiple weeks, the cloud service notices differences in a shape of a tree. Or, using measurements from an hour, the cloud service detects snow accumulated on the sides of the road. In each case, the cloud service sends the computed results back to the light unit 106, which further broadcasts the changes to nearby vehicles 205.

In emergency situations, the real-time constraints are mandatory to provide application services. For example, the system must detect a child running into the street and because the child stands behind a parked car, the incoming vehicle cannot detect it, but once lighting system 100 detects a child on the street it must quickly inform the arriving vehicle 205, giving it enough time to stop. The real-time constraints are tighter when a possible collision can occur between two vehicles.

The processed sensor data returns a list of events that occur in the surrounding environment. These events report the dynamic actions that occur on the streets, and the changes in the surrounding environment that are slow and accumulate over the time: events that are not detectable by a car. The last type of events requires cloud server based support, which combines a time series of multiple sensor measurements and computes trends in the environmental change. Further, by comparing the sensor measurements and environmental changing trends with the static information that vehicle has, we enable computation of the difference in vehicle's perception with respect to lighting network 100 ground truth perception.

Further, the lighting system 100 sorts the computed events based on a priority. Some events that lighting system 100 detects may not be required to be sent to vehicles 205, but other events, which may contradict with vehicle's 205 perception or may be critical to drivers and pedestrians safety, are immediately sent to the autonomous vehicles' 205 control system. Once the critical events are detected, the lighting system 100 computes the list of the surrounding vehicles 205 in motion that should be immediately informed about the dynamic conditions.

Thus, in the manner described above, the system forms a (1) perception of the local area or environment surrounding a light unit 106 or connected device 114 or (2) a perception of a broad area or environment that includes many local areas of light units 106 or connected devices 114.

In another embodiment, the events are broadcasted by the lighting system 100 to nearby vehicles 205, and each vehicle 205 incorporates these received events in making its driving decisions. An event, for example, could be a dynamic action that occurs on the street. The light points that detect this event alert the nearby vehicles 205 by sending the event information including event description and geo-location (which can be calculated by each light point based on its own location). Further, when a vehicle 205 encounters some confusion regarding the environment (e.g., a pile of snow), it may send inquiries to nearby light units 106, and the light units 106 will reply with the updated data about the environment.

One of the advantages of the outdoor lighting system based road monitoring system is the data ownership. Currently, there are only a small number of companies that collect high-quality images about roads and surrounding areas. This data, which is critical to allow vehicles to navigate, is privately owned. However, when a city purchases the lighting system 100, the data either belongs to the city or to the lighting system 100 provider (e.g. Philips). Another advantage is that the lighting system is permanent and will monitor the area for many years, without requirement specific intervention. Therefore, it can provide a long term solution that enables the autonomous vehicle systems to be calibrated. While there might be different trade-offs in the model of data ownership between the two, because the data does not belong to any specific autonomous driving or automotive manufacture competitor, all kinds of self-driving vehicles will potentially be allowed to drive on the roads and have the same access to road information.

Figure 2B:
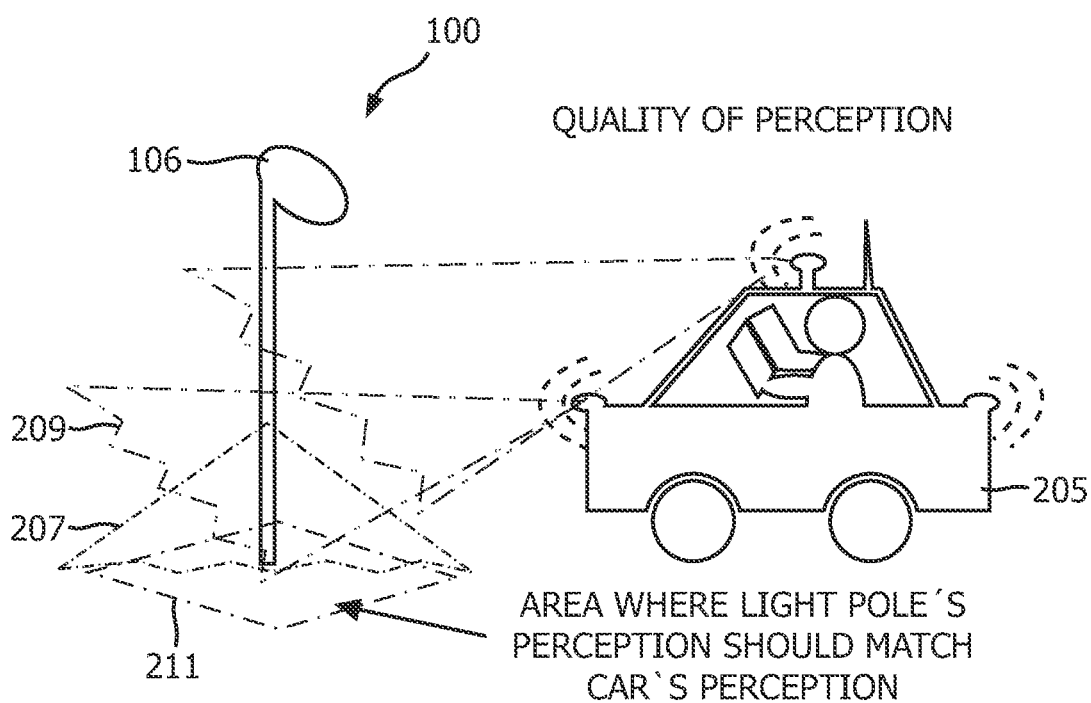
FIG. 2b is perspective view of a lighting system in accordance with embodiments of the present system.

As shown in FIG. 2B each light pole is monitoring a fixed area of a road 207. This area 207 could be adapted by adjusting the position of the sensors or by just processing the data. For instance, focusing a camera on a specific area. This can be coordinated from the CMS 102. This could also be used to ensure the "view" of the lighting system is the same of the vehicles and ensure the calibration is successful. As a vehicle continues to travel on a road, it monitors its local area 209. Because a vehicle observes the same area 211 (or at least a portion thereof) of the road as the nearby light units 106, the vehicle's perception of the road should be similar to the light units' understanding of the road conditions. Because a vehicle's sensors monitor the same area as light units' sensors, by comparing their observations, we can detect errors in the vehicles' understanding of the road conditions.

To ensure road safety, vehicles must continuously monitor the quality of their sensory system. The sensor measurement validation mechanism requires comparison of the vehicle's observation with a ground truth of the road conditions. Therefore, there exists a need of establishing ground truth of the road conditions by a system other than vehicles themselves.

The lighting network 100 collects sensor data to establish ground truth about the road conditions. As described above, each light unit 106 is instrumented with a set of sensors 110, some of which are similar to the ones used by vehicles 205, and enhanced with a sensor system that could not meet the power, size or weight constraints of cars. Because the light units' 106 understanding of the road conditions can be faulty as well, the lighting system 100 exchanges the measurements or data among the nearby sensors 110 to receive additional information about the surrounding area and further enhance the value of the ground truth. A physical model or perception of the local area or surrounding environment is used to understand the relation among surrounding light units 106, i.e. traffic conditions might be similar between two nearby light units 106.

To further enhance the understanding of the ground truth, the lighting system 100 cross-validates its understanding of the nearby road conditions with third-party services using Connected device 114 or Resource Server 112. For example, cell-phone based traffic estimations can support cross-validation of the sensor measurements that detect presence of vehicles on the road. City's planning information regarding scheduled road work or reports with issues about road conditions are used to localize points of reference between different sources of data and to further improve the understanding of ground truth.

On the road, vehicles 205 and light units 106 exchange their understanding of the road conditions. Each vehicle 205 starts with identifying itself and its position on the road. The position is presented as a GPS coordinate and timestamp. Further, the vehicle 205 sends information about the road condition. The vehicle 205 reports its distance to the sides of the road and how far it can see the road in each direction. Then, vehicle 205 reports objects that it believes to be in motion. With respect to its position, a vehicle reports location and distance to other vehicles and as well as pedestrians. Finally, the vehicle 205 reports its location with respect to the surrounding static infrastructure, e.g. building, light poles, and trees.

Similarly, each light unit 106 beacons messages with information about the conditions of the road being monitored by the particular light unit 106. The beacon message consists of the light unit 106 location and description of the road: the road width, distance from a road to any static objects, and description of dynamic objects that are on the road.

After vehicles exchange their information, both compare their own perception of the road conditions with another. On the vehicle side, it periodically monitors its status of the sensory system and computes the sensors' trust value. This trust value allows a vehicle to estimate when sensors become faulty and when sensor calibration and online measurement verification is needed. On the lighting system 100 side, light units 106 compare the vehicles' 205 sensor traces with their ground truth measurements. For each car, lighting system 100 computes the vehicle's 205 trust value. The computed trust value is reported to the vehicle 205, and it is used to estimate global quality of perception among all vehicles 205 driving on the monitored road way.

When a vehicle 205 detects errors in its sensor measurements, it either decides to pull over, or continues to drive and compares its measurements with other points of reference. Depending on the type of a vehicle 205, car manufacturers may implement various strategies to handle the inconsistency in road perception, or specific laws may be passed to force detailed actions. When a light unit 106 detects errors in vehicles' measurements it reports this event to municipalities and sends a warning message to other nearby vehicles 205. Further a light unit 106 may send to the vehicle 205 with erroneous perception suggestions with actions that would allow the vehicle to safely pull over and stop.

When lighting system 100 detects vehicles with faulty sensor system, it attempts to bring not only the awareness of the autonomous vehicles, but to also alarm the vehicle's passengers. As is known in the art, lighting system 100 can start or change its lights to bright warning colors, such as red, and sends wireless information to nearby mobile devices, such as smart phones and tablets. Additional alarm sirens can be used to get attention of the malfunctioned vehicle's passengers.

Finally, the lighting based monitoring of the surrounding area for autonomous vehicles can be also applied to other technologies of commuting. For example, self-driving trains can use lighting system 100 data gathered from the train stations to detect position of people who stand very close to the train tracks. Similarly, the lighting system 100 can monitor the places where roads cross the train tracks, or areas where people attempt to walk across the tracks.

Figure 3:
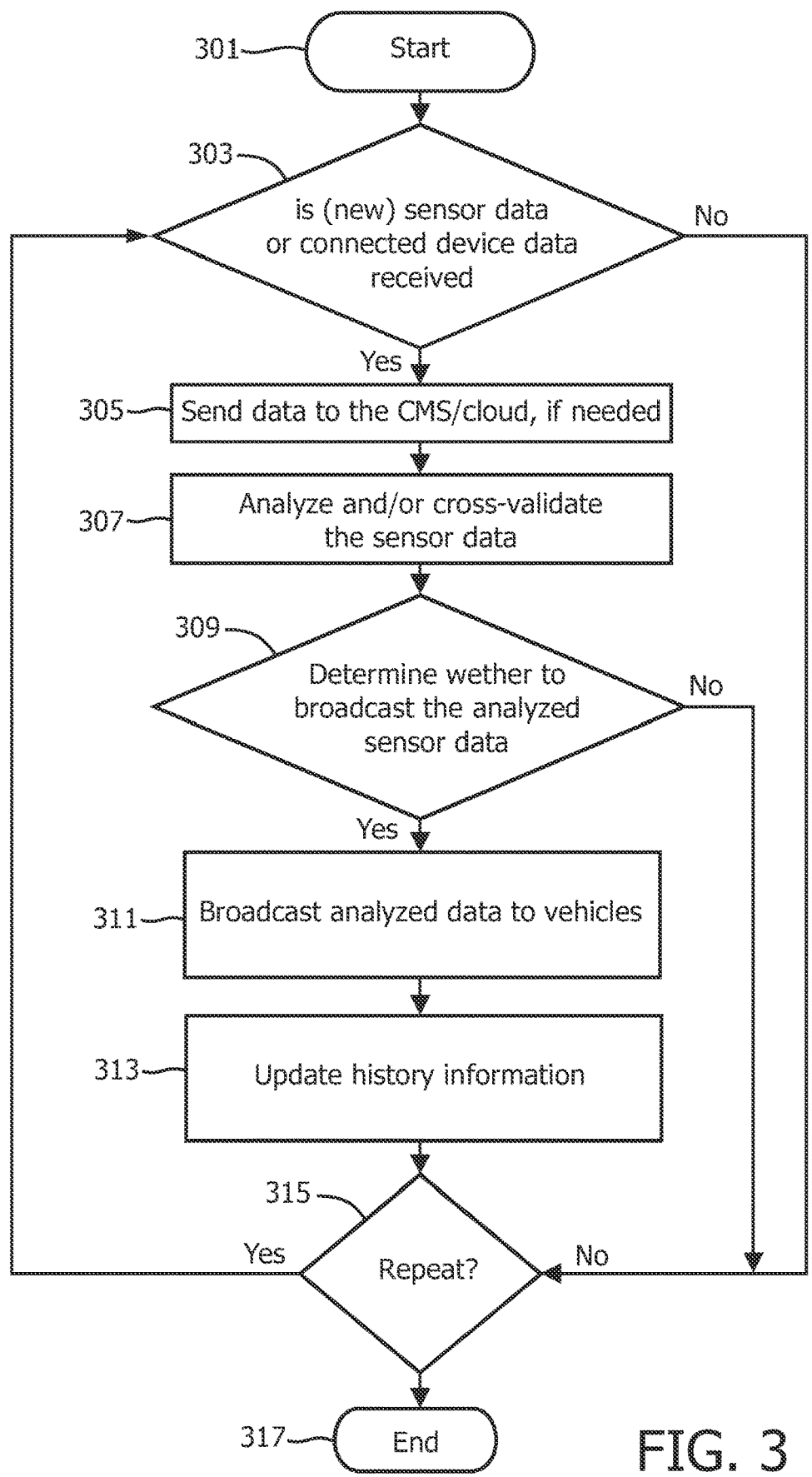
FIG. 3 shows a flow diagram that illustrates a process in accordance with embodiments of the present system.

FIG. 3 shows a flow diagram that illustrates a process 300 in accordance with embodiments of the present system. The process 300 may be performed by a system as shown in FIG. 1. The process 300 may include one of more of the following steps. Further, one or more of these steps may be combined and/or separated into sub-steps, if desired. In operation, the process may start during step 301 and then proceed to step 303.

During step 303, the process determines if one of the sensor types 107 detects new sensor data from a light unit 106 e.g. a detection of a vehicle/user, or if new connected device 114 data is received. If this determination is Yes, then the process proceeds to step 305.

During step 305 of the process, some or all of the data from sensors 226 from each light unit 106 and/or connected device 114, which may include information related to monitored areas in the vicinity of one or more luminaires/connected devices in accordance with embodiments of the present system, is sent to CMS or cloud service 102 (or one or more controllers 105). After obtaining the information, the process may continue to step 307.

During step 307, the process analyzes the sensor data, by either the CMS/cloud service 102 or one or more controllers 105. For example, the process may analyze if detection in a respective light unit 106 is a "true" or "false" detection; establish ground truth of road conditions and [road] environment; and forms an overview of the surrounding environment (e.g. objects, geography, weather & traffic conditions, etc.), as further described above.

In step 309, if the analyzed data should be broadcast or sent to vehicles 205, if not, the process proceeds to step 315. If yes, the process proceeds to step 311, and the analyzed data is sent, according the embodiments present invention. After completing step 311, the process continues to step 313.

During step 313, the present system may form and/or update history information (e.g., statistical information) of a memory of the present system in accordance with the data, detection thresholds, number of "true" or "false" detections or other received information. For example, an indicator for behavior change, dimming schedule, ambient level, and other parameters, e.g. road type, traffic volume, weather status, the sensor information, day, date, time, user travel patterns, etc. which information may be used at a later time. After completing step 313, the process may continue to step 315.

During step 315, the present system may determine whether to repeat one or more steps of the process. Accordingly, if it is determined to repeat one or more steps of the process, the process may continue to step 303 (or to another step which is desired to be repeated). Conversely, if it is determined not to repeat one or more steps of the process, the process may continue to step 317, where it ends. The process may be repeated at certain periodic and/or non-periodic time intervals. By repeating the process, history information may be accessed and used to determine, for example, rate of change of the sensor information. This information may be used to determine and/or tune appropriate responses in lighting system 100 to various situations and events.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A self-driving autonomous vehicle sensor support system, comprising:
    a lighting network having:
        a plurality of light units wherein at least one light unit includes at least one sensor; and
        a controller, wherein the controller,
            forms, based on data from the at least one sensor, a sensor map of an area local to one or more of the plurality of light units;
            receives sensor measurement data from an autonomous vehicle relating to at least a portion of the area,
            determines a difference in sensor data between the sensor map of the area and the sensor measurement data from the autonomous vehicle,
            cross-validates the portion of the area of the sensor map and sensor measurement data and provide the difference in sensor data to the autonomous vehicle, and
            determines an event based on the difference in the sensor map and the sensor measurement data from the autonomous vehicle, wherein the event is evaluated based upon sensor data from the lighting network that is outside a sensor detection range of the autonomous vehicle; and
            communicates an action related to the event or the cross validated portion of area to the autonomous vehicle, wherein the action is an alert/emergency action or an update/calibration action to the vehicle measurement system.

2. The self-driving autonomous vehicle sensor support system of claim 1, wherein the controller forms the sensor map, using received sensor data from a first light unit and at least one of a second light unit, connected devices and resource servers that obtain information from additional sources.

3. The self-driving autonomous vehicle sensor support system of claim 2, wherein the controller determines a ground truth, wherein the ground truth is determined by continuously monitoring the sensor data from the lighting units of the road condition and/or other devices and resource servers.

4. The self-driving autonomous vehicle sensor support system of claim 1, wherein the cross-validation includes comparing the light unit's sensor map of the area and the sensor measurement data from the autonomous vehicle.

5. The self-driving autonomous vehicle sensor support system of claim 1, wherein the system transmits cross-validation sensor information to the autonomous vehicle or broadcasts cross-validation sensor information to any other autonomous vehicles.

6. The self-driving autonomous vehicle sensor validation system of claim 1, wherein the controller stores changes to the perception, when sensors send new sensor data, to update the sensor map and form a history of perceptions.

7. The self-driving autonomous vehicle sensor support system of claim 6, wherein the controller generates a prioritized list of events relating to the changes to the perception, and determines which events should be sent to the autonomous vehicle or broadcasted to other autonomous vehicles.

8. A method of supporting a self-driving autonomous vehicle's sensor system using a lighting network, the lighting network having a plurality of light units wherein at least one light unit includes at least one sensor type and a centralized or distributed controller; in communication with the light units, the method comprising the steps of:
    receiving, in a first light unit, sensor data from a first sensor;
    forming, in the controller and based on data from the at least one sensor, a local environmental sensor map of an area local to one or more of the plurality of light units;
    receiving sensor measurement data from an autonomous vehicle relating to at least a portion of the area;
    determining a difference in sensor data between the local environmental sensor map and the sensor measurement data from the autonomous vehicle;
    cross-validating the portion of the area of the local environmental sensor map and the sensor measurement data; and
    determining an event based on the difference in sensor data, wherein the event is evaluated based upon sensor data from the lighting network that is outside a sensor detection range of the autonomous vehicle; and
    communicating and action based on the event or cross-validated the portion of the area, wherein the action is an alert/emergency action or an update/calibration action to the vehicle measurement system.

9. The method of claim 8, further including the step of, determining, in the controller a ground truth, wherein the ground truth is determined by continuously monitoring the sensor data from the lighting units of the road condition and/or other devices and resource servers.

10. The method of claim 8, wherein the step of cross-validating includes comparing the light unit's sensor map of the area and the sensor measurement data from the autonomous vehicle.

11. The method of claim 8, further including the step of transmitting cross-validation sensor information to the autonomous vehicle or broadcasting cross-validation sensor information to any autonomous vehicle in range.

12. The method of claim 8, further including the step, changing the sensor map, in the controller when sensor send new sensor data, and updating the sensor map and forming a history of sensor maps.

13. The method of claim 12, wherein the step of changing the sensor map includes generating a prioritized list of events relating to the changes to the sensor map, and determining which events should be sent to the autonomous vehicle or broadcasted to other autonomous vehicles or sent to third parties.

14. The method of claim 1, wherein the event includes one or more of traffic or weather conditions, detection of a road emergency situation/safety issue, and detection of vehicle malfunctions.

\* \* \* \* \*